3,054,810
METHOD OF PREPARING 21-MONOESTERS OF STEROIDS OF THE PREGNANE SERIES
Lewis J. Leeson, Park Ridge, N.J., James A. Lowery, New City, N.Y., and Charles Krieger, Clifton, N.J., assignors to American Cyanamid Company, New York, N.Y., a corporation of Maine
No Drawing. Filed Aug. 15, 1960, Ser. No. 49,453
8 Claims. (Cl. 260—397.45)

This invention relates to a new process for preparing 21-monoesters of steroids of the pregnane series. More particularly, it relates to the preparation of 21-monoesters of 21-hydroxylated 16, 17-cis dihydroxy steroids of the pregnane series.

In the past, it has been difficult to prepare 21- monoesters of 16,21-dihydroxy steroids by conventional means because of the resulting mixtures which would contain 21-monoesters and 16,21-diesters. The separation and purification of such mixtures is difficult and the pure compounds require a considerable amount of work.

We have now found that 16,17,21-trihydroxy steroids of the pregnane series can be reacted to form the 16,17-cis borates and subsequently with carboxylic acid anhydrides or halides to produce 21-monoesters following which the 16,17-hydroxy groups are regenerated to produce pure 21-esters.

The present invention relates to an improved process of preparing steroids having the formula:

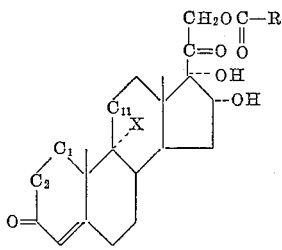

wherein $C_2$—$C_1$ is a divalent radical of the group consisting of

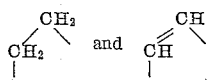

$C_{11}$ is a divalent radical of the group consisting of

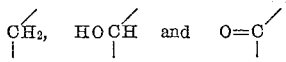

X is a member of the group consisting of hydrogen and halogen radicals; and R is a member of the group consisting of lower alkyl, carboxy lower alkyl and carboxyaryl radicals which comprises reacting the corresponding 21-hydroxy steroid with a boron containing compound and a carboxylic acid halide or anhydride in the presence of an organic solvent inert to the reactants and subsequently regenerating the 16α,17α-dihydroxy steroid.

In the present process it is believed that an intermediate 16α,17α-steroid borate is formed and the 21-ester subsequently formed. The present process can also be carried out by reacting a compound having the formula:

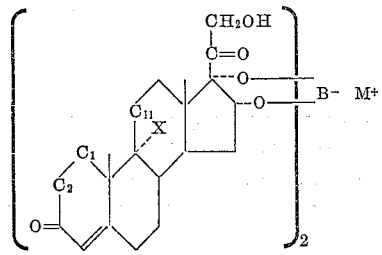

wherein $C_1$—$C_2$, $C_{11}$ and X are as defined above, B is a boron radical and M+ is selected from the group consisting of a hydrogen proton and alkali metal cations with a member selected from the group consisting of carboxylic acid anhydrides and carboxylic acid halides and thereafter regenerating the 16,17-dihydroxy 21-esterified steroid.

The above process to form 21-esterified steroids is applicable to any steroids which do not contain interfering functional groups. The preferred steroids are those illustrated above. In carrying out the process of the present invention, the carboxylic acid anhydrides and halides which may be used are limited only by their availability. Among those considered useful are lower alkanoic acids such as acetic acid, propionic acid, butyric acid, pentanoic acid and the like. Saturated aliphatic dibasic acids such as oxalic acid, malonic acid, succinic acid, glutaric acid, adipic acid and so forth can be used. Unsaturated aliphatic dibasic acids such as maleic acid and fumaric acid can also be used. Alicyclic acids such as cyclohexylacetic acid, hexahydro benzoic acid, cyclopentylpropionic acid and the like; polybasic or hydroxylated carboxylic acids such as methanetetraacetic icad, citric acid, tartaric acid, gluconic acid, mucic acid, saccharic acid, etc.; aryl carboxylic acids, aralkanoic acids, and alkaryl carboxylic acids such as benzoic acid, the phthalic acids, the mellitic acids, the napthoic acids, phenylacetic acid, the toluic acids and the like; sulfonic acids such as methanesulfonic acid, ethanesulfonic acid, benzenesulfonic acid, toluenesulfonic acids etc. and heterocyclic acids such as furoic acid, nicotinic acid, pyrroleacetic acid, pyrazinoic acid, thienoic acid, camphoric acid and the like.

In carrying out the process of the present invention, the 16,17-cis borates of steroids of the pregnane series can be reacted with boric acid, boric oxide, alkali metal borates and so forth and subsequently with a carboxylic acid anhydride or acid halide. Following regeneration of the 16,17-dihydroxy group a pure steroid 21-ester is obtained.

The reaction is preferably carried out in a solvent inert to the reactants which is sufficiently polar to effect at least some degree of solution of the reactants. The preferred solvent is dimethylformamide which has given good results. Among the other solvents which can be used are, for example, tetrahydrofuran, dimethylacetamide, dimethylsulfoxide, diethyl succinate, diethyl carbonate, dioxane, ethyl acetate, methyl acetate and the like. In order to obtain best results it is generally desirable to also have present an inert acid acceptor such as, for example, pyridine, trimethylamine, triethylamine, quinoline, picoline, collidine, lutidine, morpholine and the like. In some instances, the solvent and acid acceptor may both be supplied by the use of a single compound such as for example, pyridine, picoline or morpholine.

The process of the present invention is preferably carried out at a temperature ranging from −10° to 120° C. The reaction is usually complete in a period ranging from a few minutes to several days. The preferred temperature range is from about 5° to about 60° C. within which temperature range the reaction is complete from about 8 to 24 hours.

After completion of the reaction, the reaction mixture is diluted with cold dilute aqueous acid. The desired products are generally insoluble and may be recovered in crude form by filtration. Purification is effected by crystallization from solvents such as for example, aqueous acetone, aqueous methanol, acetone-petroleum ether, chloroform-petroleum ether and the like.

The compounds prepared by the process of the present invention are esters of highly active compounds such as triamcinolone (9α-fluoro - 11β,16α,17α,21 - tetrahydroxy-1,4-pregnadiene-3,20-dione). The 21-monoesters of triamcinolone are active steroids producing a more prolonged reaction than the corresponding alcohols. The 21-esters of 16,17-dihydroxy steroids of the pregnane series are also useful topically and can be combined with various pharmaceutical vehicles for topical application.

The following examples illustrate in detail the preparation of 21-monoesters of 16,17-dihydroxy steroids of the pregnane series.

EXAMPLE I

*Preparation of Triamcinolone 21-Hemisuccinate*

Two grams of triamcinolone (9α-fluoro-11β,16α,17α, 21-tetrol-1,4-pregnadiene-3,20-dione) sodium borate is dissolved in 8 ml. of pyridine. To this solution is added one gram of succinic anhydride and the mixture heated on a steam bath to effect solution. The mixture is permitted to stand for twenty-four hours at room temperature, and 35 ml. of a 3% aqueous sodium bicarbonate solution is added. The mixture is extracted three times with chloroform and twice with ether. Acidification of the aqueous phase results in precipitation of the triamcinolone 21-monohemisuccinate. Recrystallization from hot water gives a material of desired purity.

EXAMPLE II

*Preparation of Triamcinolone 21-Hemiphthalate*

This product is prepared by the same procedure described in Example I, using 1.5 grams of phthalic anhydride in place of succinic anhydride.

EXAMPLE III

*Preparation of Triamcinolone 21-Acetate*

A solution of 0.7 grams of triamcinolone sodium borate in 2½ ml. of pyridine is prepared. To this solution is added 0.35 ml. of acetic anhydride. The mixture is permitted to stand overnight and 25 ml. of water is added. Dilute hydrochloric acid is introduced until there is no further precipitation. Recrystallization of the product from acetone-petroleum ether results in white crystals of triamcinolone 21-acetate.

EXAMPLE IV

*Preparation of Triamcinolone 21-n-Butyrate*

This product is prepared by the same procedure described in Example III, using 1 gram of triamcinolone sodium borate, 7 ml. of pyridine, and 0.8 ml. of n-butyric anhydride.

EXAMPLE V

*Preparation of Triamcinolone 21-t-Butyl Acetate*

One half gram of triamcinolone sodium borate is dissolved in 7 ml. of pyridine, and 1 ml. of t-butyl acetyl chloride is added. After 6 hours the solution is mixed with 40 ml. of water, and dilute aqueous hydrochloric acid is added until there is no further precipitation. After separation by filtration, the product is recrystallized from acetone-petroleum ether solution.

EXAMPLE VI

*Preparation of 21-Acetoxy-9α-Fluoro-11β,16α,17α-Trihydroxy-4-Pregnene-3,20-Dione*

0.7 grams of 9α-fluoro-11β,16α,17α,21-tetrahydroxy-4-pregnene-3,20-dione 16,17-sodium borate is dissolved in 2.5 ml. of pyridine. To this solution is added 0.35 ml. of acetic anhydride. The resulting mixture is allowed to stand overnight, and 25 ml. of water is then added. Dilute hydrochloric acid is added until there is no further precipitation. The product is separated by filtration and recrystallized from acetone-petroleum ether, yielding white crystals of 21-monoacetate.

EXAMPLE VII

*Preparation of Triamcinolone 21-Hemisuccinate*

One gram of triamcinolone is dissolved in 6 ml. of pyridine, and 500 mg. of boric oxide and 254 mg. of succinic anhydride are added. The reaction mixture is allowed to stand at room temperature for 48 hours, after which time about 6 ml. of dioxane and 25 ml. of water are added. Dilute aqueous hydrochloric acid is added until no further precipitation occurs, and the mixture is maintained at 5° C. overnight. The product, triamcinolone 21-hemisuccinate, is separated by filtration.

EXAMPLE VIII

*Preparation of the 21-Acetate of 9α-Fluoro-11β,16α, 17α,21-Tetrahydroxy-4-Pregnane-3,20-Dione*

One gram of 9α-fluoro-11β,16α,17α,21-tetrahydroxy-4-pregnene-3,20-dione 16α,17α-borate is dissolved in 4 ml. of dimethylformamide. To this solution is added 0.2 ml. pyridine and 0.4 ml. of acetic anhydride. This reaction mixture is maintained at room temperature for 6 hours, after which time it is poured into 10 ml. of dilute aqueous hydrochloric acid at 0° C. This mixture is kept chilled overnight at 4° C., after which the product is separated by filtration and then recrystallized from aqueous methanol.

EXAMPLE IX

*Preparation of the 21-Acetate of 9α-Fluoro-11β,16α,17α, 21-Tetrahydroxy-4-Pregnene-3,20-Dione*

One gram of 9α-fluoro-11β,16α,17α,21-tetrahydroxy-4-pregnene, 3,20-dione and 200 mg. of boric acid is dissolved in 4 ml. of dimethylformamide. To this solution is added pyridine, acetic anhydride as described in Example VIII; and the reaction is completed. The product is recovered as described in Example VIII.

EXAMPLE X

*Preparation of the 21-Acetate of 9α-Fluoro-11β,16α,17α, 21-Tetrahydroxy-4-Pregnene-3,20-Dione*

To 0.5 grams of 9α-fluoro-11β,16α,17α,21-tetrahydroxy-4-pregnene-3,20-dione 16α,17α-borate is added 2 ml. of dimethylformamide, 0.2 ml. of pyridine and 0.2 ml. of acetyl chloride. The resulting solution is mixed for 6 hours at room temperature. The solution is then poured into 25 ml. of dilute aqueous hydrochloric acid at 0° C., causing a tan solid to separate. This precipitate is removed by filtration and recrystallized from acetone-petroleum ether, yielding the 21-acetate of 9α-fluoro-11β,16α, 17α,21-tetrahydroxy-4-pregnene-3,20-dione.

EXAMPLE XI

*Preparation of 11β,16α,17α,21-Tetrahydroxy-4-Pregnene-3,20-Dione 21-Hemisuccinate*

An experiment is carried out in which 11β,16α,17α,21-tetrahydroxy-4-pregnene-3,20-dione is reacted with sodium borate in pyridine and subsequently with succinic anhydride. The reaction product is worked up as described in Example I and the product purified by crystallization from hot water. The desired product is obtained in good yield.

EXAMPLE XII

*Preparation of 16α,17α,21-Trihydroxy-4-Pregnene-3,11, 20-Trione 21-Hemisuccinate*

The steroid 16α,17α,21-trihydroxy-4-pregnene-3,11,20-trione is reacted with sodium borate in pyridine. To the reaction mixture is added succinic anhydride and the resulting reaction product worked up as described in Example I.

EXAMPLE XIII

*Preparation of 11β,16α,17α,21-Tetrahydroxy-1,4-Pregnadiene-3,20-Dione 21-Hemisuccinate*

In a further experiment, 11β,16α,17α,21-tetrahydroxy-1,4-pregnadiene-3,20-dione sodium borate is dissolved in pyridine and reacted with succinic anhydride. The product is recovered and purified as described in Example I.

EXAMPLE XIV

*Preparation of 9α-Chloro-11β,16α,17α,21-Tetrahydroxy-4-Pregnene-3,20-Dione 21-Hemisuccinate*

The steroid 9α-chloro-11β,16α,17α,21-tetrahydroxy-4-pregnene-3,20-dione sodium borate is dissolved in pyridine and reacted with succinic anhydride. After allowing the reaction mixture to stand 24 hours, the product is recovered and purified as described in Example I.

EXAMPLE XV

*Preparation of the 21-Acetate of 9α-Fluoro-11β,16α,17α, 21-Tetrahydroxy-4-pregnene-3,20-Dione*

One gram of 9α-fluoro-11β,16α,17α,21-tetrahydroxy-4-pregnene-3,20-dione and 200 mg. of boric acid is dissolved in 4 ml. of dimethylformamide. To this solution is added pyridine, acetyl chloride as described in Example VIII; and the reaction is completed. The product is recovered as described in Example VIII.

We claim:
1. A process of preparing compounds having the formula:

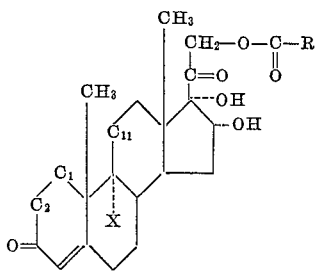

wherein R is selected from the group consisting of lower alkyl, carboxy lower alkyl and carboxyaryl radicals, $C_{11}$ is selected from the group consisting of

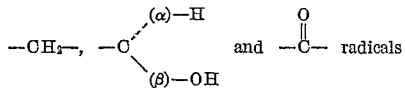

X is selected from the group consisting of hydrogen, chloro and fluoro radicals and —$C_1$—$C_2$— is selected from the group consisting of —$CH_2$—$CH_2$— and —CH=CH— groups which comprises reacting the corresponding 21-hydroxy steroid with a boron compound selected from the group consisting of boric acid, boric oxide and alkali metal borates and an acylating agent selected from the group consisting of acid anhydrides and acid chlorides in the presence of an organic solvent inert to the reactants, acidifying the reaction mixture and recovering said compound therefrom.

2. A process in accordance with claim 1 in which R is a carboxy lower alkyl radical and X is the fluorine atom.

3. In a process of preparing 9α-fluoro-11β,16α,17α,21-tetrol-1,4-pregnadiene-3,20-dione - 21 - hemisuccinate, the steps which comprise reacting 9α-fluoro-11β,16α,17α,21-tetrol-1,4-pregnadiene-3,20-dione sodium borate with succinic anhydride in a solvent inert to the reactants, acidifying and recovering said compound therefrom.

4. In a process of preparing 9α-fluoro-11β,16α,17α,21-tetrol-1,4-pregnadiene-3,20-dione-21-acetate, the steps which comprise reacting 9α-fluoro-11β-16α,17α,21-tetrol-1,4-pregnadiene-3,20-dione sodium borate with acetic anhydride subsequently acidifying the reaction mixture and recovering said compound therefrom.

5. In a process of preparing 9α-fluoro-11β,16α,17α,21-tetrol-1,4-pregnadine-3,20-dione-21-t-butyl acetate, the steps which comprise reacting 9α-fluoro-11β,16α,17α,21-tetrol-1,4-pregnadiene-3,20-dione sodium borate in a solvent inert to the reactants with t-butyl acetyl chloride, subsequently acidifying the reaction mixture and recovering said compound therefrom.

6. In a process of preparing 21-acetoxy-9α-fluoro-11β,16α,17α-trihydroxy-4-pregnene-3,20-dione, the steps which comprise reacting 9α-fluoro-11β,16α,17α,21-tetrahydroxy-4-pregnene-3,20-dione-16,17-sodium borate with acetic anhydride in a solvent inert to the reactants, subsequently acidifying the reaction mixture and recovering said compound therefrom.

7. A process of preparing 9α-fluoro-11β,16α,17α,21-tetrol-1,4-pregnadiene-3,20-dione-21-hemisuccinate which comprises reacting 9α-fluoro-11β,16α,17α,21-tetrol-1,4-pregnadine-3,20-dione with boric oxide and subsequently with succinic anhydride in a solvent inert to the reactants and finally acidifying the reaction mixture and recovering said compound therefrom.

8. A process of preparing 21-acetoxy-9α-fluoro-11β,16α,17α-tetrahydroxy-4-pregnene-3,20-dione which comprises reacting 9α-fluoro-11β,16α,17α,21-tetrahydroxy - 4 - pregnene-3,20-dione with boric acid in dimethylformamide and subsequently with acetic anhydride and finally acidifying the reaction mixture and recovering said product therefrom.

References Cited in the file of this patent
UNITED STATES PATENTS

| | | |
|---|---|---|
| 2,789,118 | Bernstein et al. | Apr. 16, 1957 |
| 2,831,003 | Thomas | Apr. 15, 1958 |
| 2,979,517 | Herzog | Apr. 11, 1961 |
| 2,986,559 | Benica | May 30, 1961 |

OTHER REFERENCES

Bernstein et al.: J. A. C. S. 78, 5693–5694.
Mills et al.: J. A. C. S. 81, 1264–1266.
Fox et al.: J. A. C. S. 82, 2580–2585 (May 20, 1960).